(12) United States Patent
Kobayashi (10) Patent No.: US 9,798,104 B2
(45) Date of Patent: Oct. 24, 2017

(54) ZOOM LENS BARREL, INTERCHANGEABLE LENS, AND TELEVISION CAMERA DEVICE

(71) Applicant: FUJIFILM Corporation, Tokyo (JP)

(72) Inventor: Hideo Kobayashi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/464,719

(22) Filed: Mar. 21, 2017

(65) Prior Publication Data

US 2017/0192196 A1    Jul. 6, 2017

Related U.S. Application Data

(63) Continuation of application No. PCT/JP2015/001912, filed on Apr. 6, 2015.

(30) Foreign Application Priority Data

Sep. 30, 2014   (JP) .................................. 2014-200847

(51) Int. Cl.
*G02B 7/04*    (2006.01)
*G02B 7/14*    (2006.01)

(52) U.S. Cl.
CPC  *G02B 7/04* (2013.01); *G02B 7/14* (2013.01)

(58) Field of Classification Search
CPC ..................................... G02B 7/04; G02B 7/14
See application file for complete search history.

(56) References Cited

U.S. PATENT DOCUMENTS

2005/0180275 A1*   8/2005  Shiraki ..................... G02B 7/08
                                                              369/44.15
2010/0220402 A1    9/2010  Santo et al.
2015/0155768 A1    6/2015  Hsu et al.

FOREIGN PATENT DOCUMENTS

| CN | 203761238 U | 8/2014 |
| JP | 2003-149537 A | 5/2003 |
| JP | 2005-049729 A | 2/2005 |
| JP | 2005-250074 A | 9/2005 |
| JP | 2006-343470 A | 12/2006 |
| JP | 2007-041405 A | 2/2007 |
| JP | 2009-251474 A | 10/2009 |

(Continued)

OTHER PUBLICATIONS

International Search Report issued in PCT/JP2015/001912; dated Aug. 4, 2015.

(Continued)

*Primary Examiner* — Joseph P Martinez
(74) *Attorney, Agent, or Firm* — Studebaker & Brackett PC (57) ABSTRACT

A zoom lens barrel houses plural lens frames holding plural movable lens units and supporting the plural movable lens units so that the movable lens units are movable forward and rearward along an optical axis. The zoom lens barrel includes a first lens frame and a second lens frame of the plural lens frames adjacent to each other, and plural first linear motors and plural second linear motors that move the first lens frame and the second lens frame forward and rearward independently for focusing associated with zooming. The plural first linear motors and the plural second linear motors are arranged in a plane that is perpendicular to the optical axis and also alternately on the same circumference that has a center on the optical axis.

20 Claims, 8 Drawing Sheets

(56) References Cited

FOREIGN PATENT DOCUMENTS

| JP | 2010-224526 A | 10/2010 |
|---|---|---|
| JP | 2013-037085 A | 2/2013 |
| WO | 2014/144863 A2 | 9/2014 |

OTHER PUBLICATIONS

International Preliminary Report on Patentability issued in PCT/JP2015/001912; dated Jun. 29, 2016.

\* cited by examiner

ZOOM LENS BARREL, INTERCHANGEABLE LENS, AND TELEVISION CAMERA DEVICE

CROSS-REFERENCE TO RELATED APPLICATIONS

This application is a Continuation of PCT International Application No. PCT/JP2015/001912 filed on Apr. 6, 2015, which claims priority under 35 U.S.C. §119(a) to Japanese Patent Application No. 2014-200847 filed on Sep. 30, 2014. Each of the above applications is hereby expressly incorporated by reference, in its entirety, into the present application.

BACKGROUND OF THE INVENTION

1. Field of the Invention

The present invention relates to a zoom lens barrel that houses a plurality of lens frames holding a plurality of movable lens units and supporting the plurality of movable lens units so that the movable lens units are movable forward and rearward along an optical axis, an interchangeable lens including the zoom lens barrel, and a television camera device including the zoom lens barrel.

2. Description of the Related Art

In the related art, a television camera device, which takes a video or a motion picture, is provided with a lens barrel in which a focal length can be changed and the lens barrel includes a plurality of optical systems that include focus lens groups and zoom lens groups and a plurality of support frames that support the optical systems. Since the support frames are supported so as to be movable forward and rearward along an optical axis, a change in the focal length, that is, zooming can be performed when the support frames are mechanically driven in the direction of the optical axis.

In recent years, in regard to a video or a motion picture, a video having high resolution (a large number of pixels), for example, a ultra high-definition video like Super Hi-Vision (SHV) referred to as a 8K system or a high-definition video like a digital cinema referred to as a 4K system has spread rapidly. Since a video of the 8K system or the 4K system has the number of pixels 4 to 16 times the number of pixels of a Hi-vision (HV) video in the related art, a television lens used for a television camera device, which is used to take the video of the 8K system or the 4K system, requires high accuracy of aberration. Since focusing associated with zooming is needed to obtain high accuracy of aberration, the zoom lens groups need to be corrected according to a subject distance. Further, high-speed focusing is required to follow zooming in a manual mode.

Accordingly, JP2010-224526A discloses a lens barrel including an electromagnetic actuator used to drive a focus lens relative to a lens group unit in the direction of an optical axis so that a subject distance is kept substantially constant when the lens group unit including the focus lens is mechanically driven in the direction of the optical axis. A linear motor, which includes a coil for allowing current to flow and two magnets disposed so as to face each other with the coil interposed therebetween and forming a magnetic field around the coil, is used as the electromagnetic actuator.

Further, as a lens barrel that uses a linear motor as a drive mechanism for moving a barrel forward and rearward along an optical axis, JP2006-343470A discloses a lens barrel in which a stationary barrel is provided with a stationary-side coil, a second movable barrel is provided with a movable-side coil, a first movable barrel is provided with a magnet, the first movable barrel and the magnet are moved forward and rearward along an optical axis by the stationary-side coil, and the second movable barrel is moved along the optical axis by the movable-side coil. Accordingly, since the dimension of the magnet in the direction of the optical axis can be reduced, the dimension of the barrel in a collapsed state in the direction of the optical axis can be reduced.

Furthermore, JP2005-49729A discloses a lens barrel in which a magnet is provided on the outer periphery of a holding frame for a movable lens and a coil corresponding to the magnet is provided on the inner periphery of a barrel as a stationary side. Accordingly, a small VCM (voice coil motor) is formed in the barrel without being limited by a wire since a wire does not need to be led from a movable side.

SUMMARY OF THE INVENTION

However, when focusing is performed in association with zooming to obtain high accuracy of aberration, a plurality of linear motors are needed to independently move the plurality of lens groups forward and rearward along the optical axis. However, there is a concern that the dimension of the lens barrel in the direction of the optical axis may be extremely increased in a case in which a plurality of linear motors are arranged along the optical axis and a part of the lens barrel in a radial direction may be increased in size in a case in which the plurality of linear motors are merely arranged along a direction perpendicular to the direction of the optical axis.

Further, in recent years, a detachable drive unit for driving and controlling a lens group has been adapted to be capable of being used in common to lens barrels having various specifications. However, when a lens barrel is increased in size, it is difficult to use the drive unit in common.

A method of arranging a plurality of linear motors, which are used to independently move a plurality of lens groups forward and rearward along the optical axis, are not mentioned in JP2010-224526A, JP2006-343470A, and JP2005-49729A.

The invention has been made in consideration of the above-mentioned problems, and an object of the invention is to provide a zoom lens barrel which is used to perform focusing in association with zooming and of which an increase in the size is suppressed, an interchangeable lens, and a television camera device.

A zoom lens barrel of the invention houses a plurality of lens frames holding a plurality of movable lens units and supporting the plurality of movable lens units so that the movable lens units are movable forward and rearward along an optical axis. The zoom lens barrel comprises a plurality of linear motors that move the plurality of lens frames forward and rearward for focusing associated with zooming, and the plurality of linear motors are arranged on the same circumference that has a center on the optical axis and in a plane that is perpendicular to the optical axis.

In the invention, "arranged in a plane that is perpendicular to the optical axis" is not necessarily limited to a case in which front and rear end faces of the linear motors in the direction of the optical axis are positioned on the same planes. For example, in a case in which the plurality of linear motors have different specifications and different appearances, the center positions of the respective linear motors in the direction of the optical axis may be set to be present in the same plane and the front end faces or the rear end faces of the respective linear motors in the direction of the optical axis may be set to be present in the same plane. Further, the ranges of ½ to ⅔ of the respective linear motors in the direction of the optical axis may be set to overlap each other in the direction of a plane perpendicular to the optical axis.

Furthermore, in the zoom lens barrel of the invention, the plurality of lens frames may include first and second lens frames adjacent to each other, and the plurality of linear motors may include first and second linear motors that independently move the first and second lens frames forward and rearward.

Moreover, the zoom lens barrel of the invention may include a plurality of the first linear motors and a plurality of the second linear motors, and the plurality of first and second linear motors may be alternately arranged on the same circumference.

Further, in the zoom lens barrel of the invention, the number of the second linear motors may be smaller than the number of the first linear motors, the first linear motors may be arranged at regular intervals on the same circumference, and the second linear motors may be arranged at intermediate positions between the first linear motors.

Furthermore, it is preferable that the zoom lens barrel of the invention comprises a position detecting unit that detects the positions of the movable lens units in a direction of the optical axis, and the first linear motors are disposed on both sides of the position detecting unit so as to be adjacent to the position detecting unit.

In the invention, "the first linear motors are disposed on both sides of the position detecting unit so as to be adjacent to the position detecting unit" means that the position detecting unit is disposed between the first linear motors at a position where the second linear motor is not disposed.

Further, in the zoom lens barrel of the invention, the output of the first linear motor may be the same as the output of the second linear motor.

Furthermore, in the zoom lens barrel of the invention, the output of the first linear motor may be smaller than the output of the second linear motor.

Further, in the zoom lens barrel of the invention, the output of the first linear motor may be larger than the output of the second linear motor.

Furthermore, in the zoom lens barrel of the invention, the number of the second linear motors may be two.

Further, in the zoom lens barrel of the invention, the number of the first linear motors may be three.

An interchangeable lens according to the invention comprises the zoom lens barrel of the invention.

A television camera device according to the invention comprises the zoom lens barrel of the invention.

According to the zoom lens barrel of the invention, the zoom lens barrel houses a plurality of lens frames holding a plurality of movable lens units and supporting the plurality of movable lens units so that the movable lens units are movable forward and rearward along an optical axis. The zoom lens barrel includes a plurality of linear motors that move the plurality of lens frames forward and rearward for focusing associated with zooming; and the plurality of linear motors are arranged on the same circumference that has a center on the optical axis and in a plane that is perpendicular to the optical axis. Accordingly, an increase in the size of the zoom lens barrel can be suppressed.

Further, according to the interchangeable lens of the invention, the interchangeable lens includes the zoom lens barrel of the invention. Accordingly, it is possible to realize higher accuracy of the aberration by performing focusing associated with zooming and it is possible to suppress an increase in the size of the interchangeable lens by suppressing an increase in the size of the zoom lens barrel. In the past, a detachable drive unit for driving and controlling a lens group has been used in common to lens barrels having a plurality of specifications. However, since an increase in the size of the interchangeable lens of the invention can be suppressed, a drive unit, which has been used in the past, can be used in common while realizing high accuracy of aberration.

Furthermore, according to the television camera device of the invention, the television camera device includes the zoom lens barrel of the invention. Accordingly, since an increase in the size of the zoom lens barrel is suppressed, an increase in the size of the television lens mounted on the television camera device can also be suppressed. In the past, a detachable drive unit for driving and controlling a lens group has been used in common to television lenses of television camera devices having a plurality of specifications. However, since an increase in the size of the television lens of the television camera device of the invention can be suppressed, a drive unit, which has been used in the past, can be used in common while realizing high accuracy of aberration.

DESCRIPTION OF THE PREFERRED EMBODIMENTS

A zoom lens barrel according to a preferred embodiment of the invention will be described in detail below with reference to the drawings.

Figure 1:
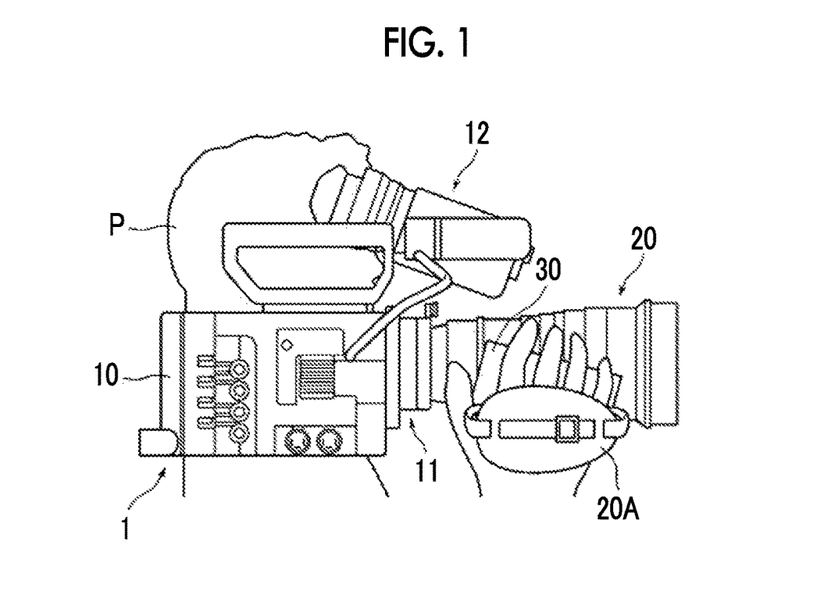
FIG. 1 is a view showing the entire embodiment of a television camera device that uses a zoom lens barrel according to an embodiment of the invention.
Figure 2:
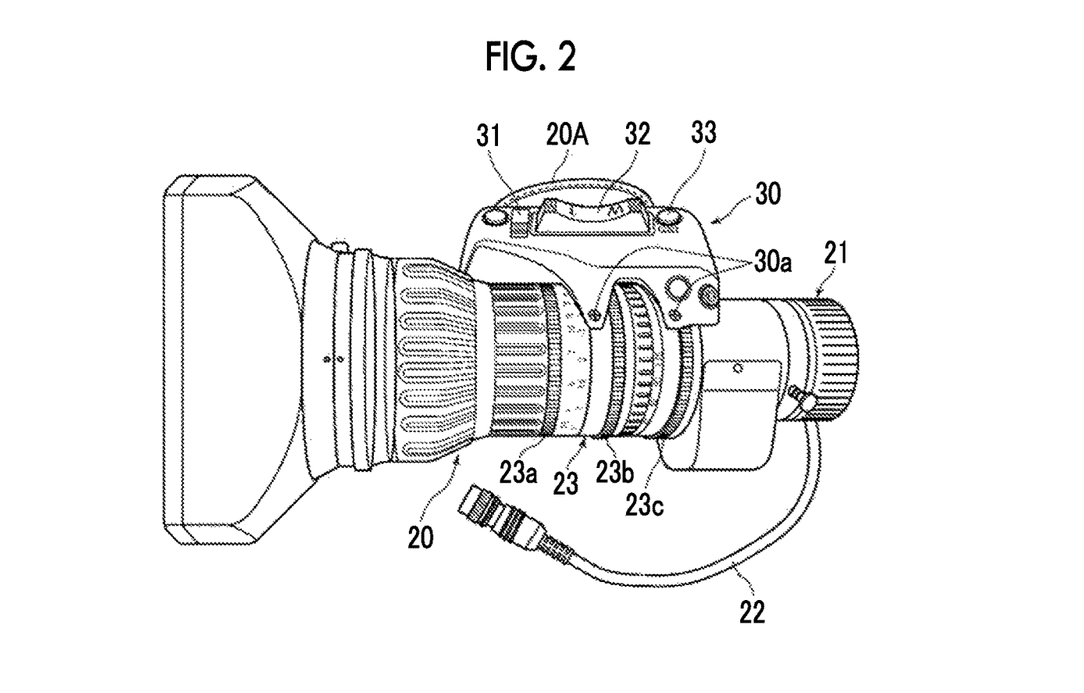
FIG. 2 is a view showing the entire embodiment of an interchangeable lens that uses the zoom lens barrel according to the embodiment of the invention.
Figure 3:
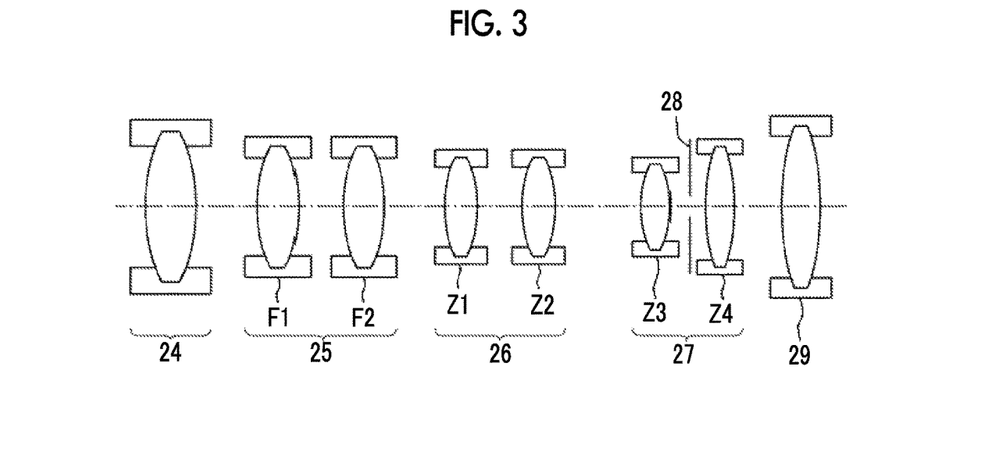
FIG. 3 is a diagram illustrating the structure of the interchangeable lens of FIG. 2.
Figure 4:
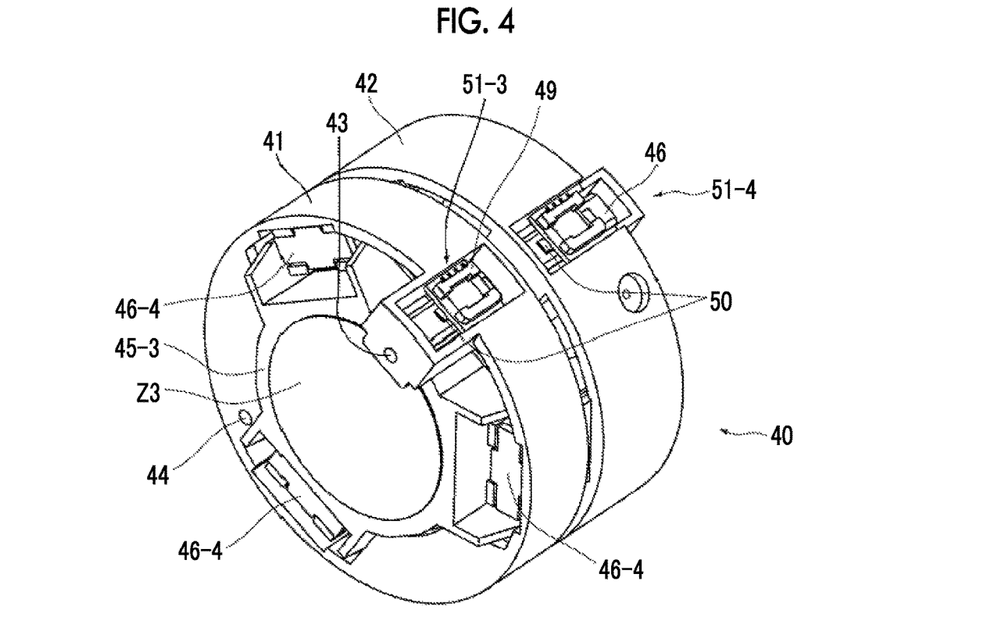
FIG. 4 is a perspective view of the zoom lens barrel according to the embodiment of the invention.
Figure 5:
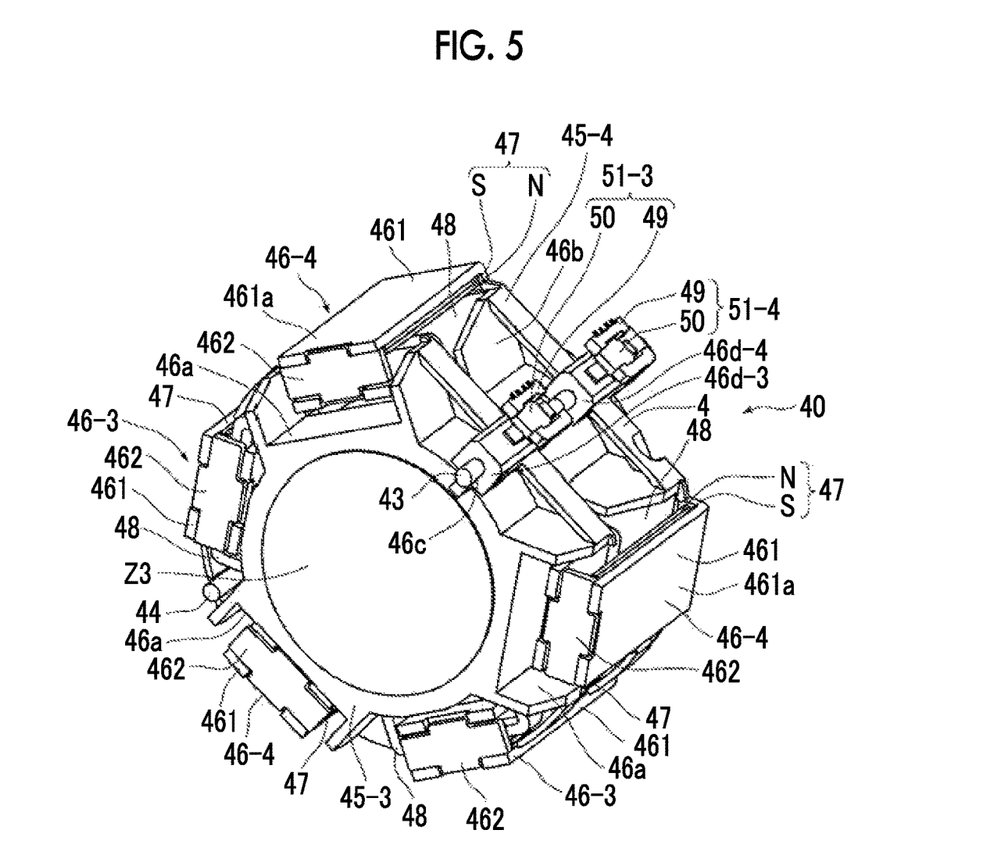
FIG. 5 is a perspective view of the zoom lens barrel of FIG. 4 from which a barrel body has been removed.
Figure 6:
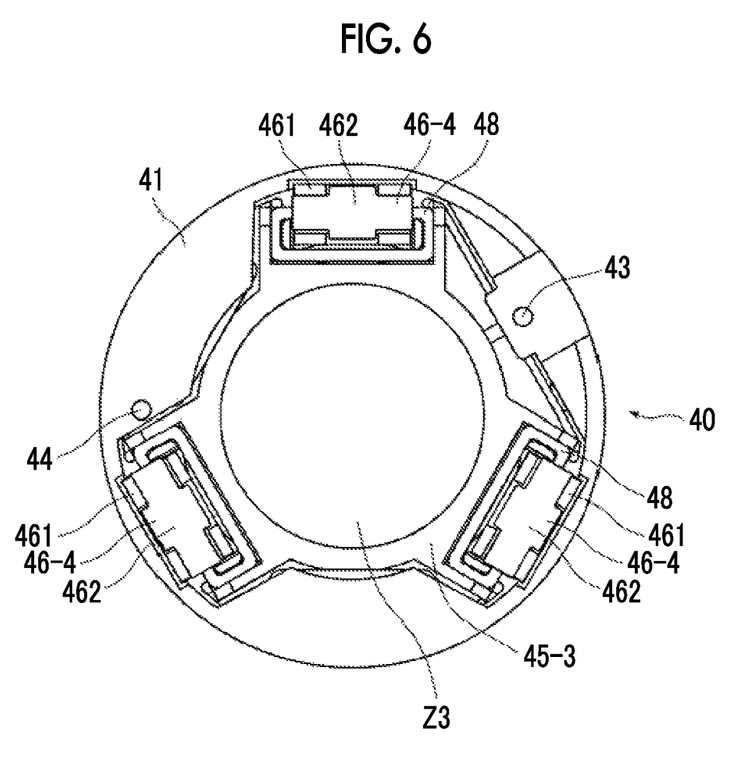
FIG. 6 is a front view of the zoom lens barrel according to the embodiment of the invention.
Figure 7:
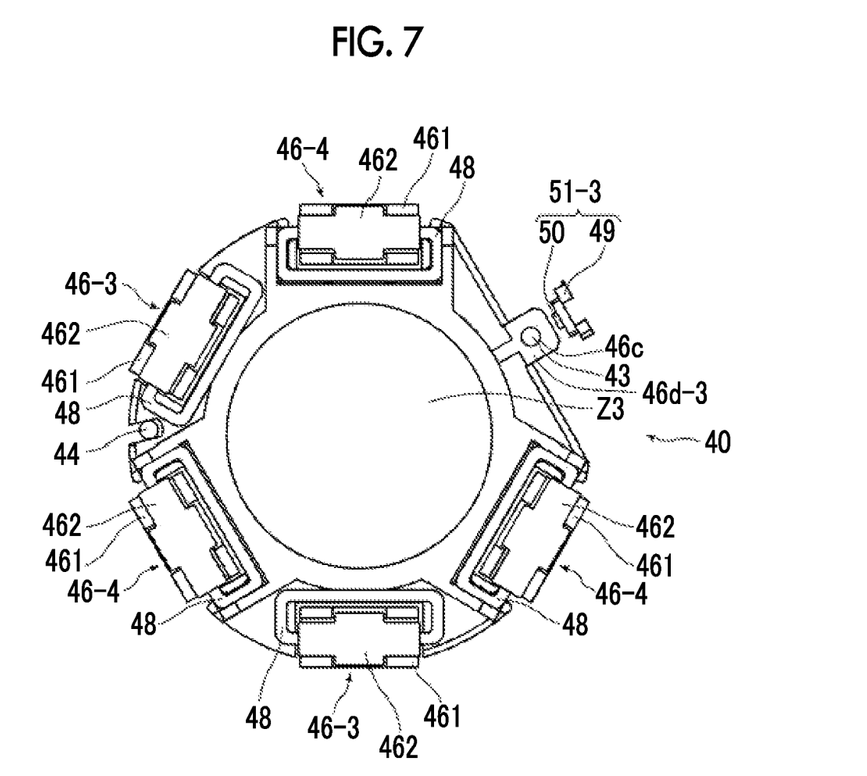
FIG. 7 is a front view of the zoom lens barrel of FIG. 6 from which the barrel body has been removed.
Figure 8:
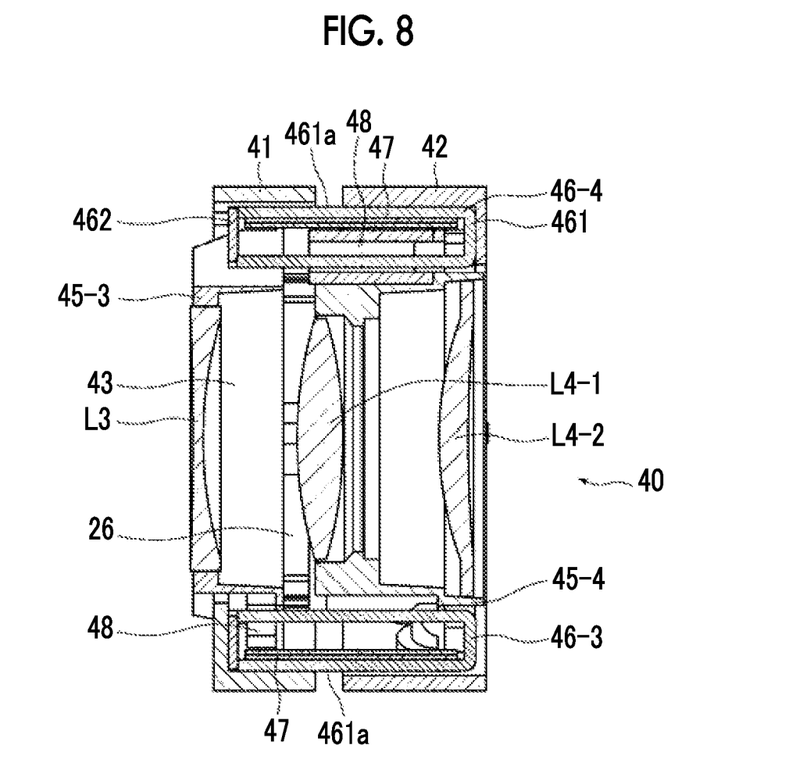
FIG. 8 is a cross-sectional view of the zoom lens barrel of FIG. 4 taken along an optical axis.

FIG. 1 is a view showing an embodiment of a television camera device that uses a zoom lens barrel according to an embodiment of the invention, FIG. 2 is a view showing an embodiment of an interchangeable lens that uses the zoom lens barrel according to the embodiment of the invention, FIG. 3 is a diagram illustrating the structure of the interchangeable lens of FIG. 2, FIGS. 4 and 6 are a perspective view and a front view of the zoom lens barrel according to the embodiment of the invention, FIG. 5 is a perspective view of the zoom lens barrel of FIG. 4 from which a barrel body has been removed, FIG. 7 is a front view of the zoom lens barrel of FIG. 6 from which the barrel body has been removed, and FIG. 8 is a cross-sectional view of the zoom lens barrel of FIG. 4 taken along an optical axis.

As shown in FIG. 1, a television camera device 1 includes a television camera device body 10, a television lens 20 that is detachably mounted on a lens mounting portion 11 provided substantially at the central portion on the front surface of the television camera device body 10, a finder device 12 that is connected to a front upper portion of the television camera device body 10, and a drive unit 30 that is detachably mounted on the side of the television lens 20 and includes a grip portion 20A.

A photographer P takes, for example, the television camera device body 10 on one's right shoulder; grips the grip portion 20A of the drive unit 30 with one's right hand to fix the television camera device 1; adjusts the focus and the zoom of the drive unit 30 to be described below, an iris, and the like while looking at a finder of the finder device 12 with one's right eye; and images a subject.

The television lens 20 mounted on the television camera device 1 is an interchangeable lens that is to be mounted on television camera device bodies having various specifications, and will be described below as an interchangeable lens 20.

As shown in FIG. 2, the interchangeable lens 20 of this embodiment includes a lens mount 21 that is provided at the base portion of a barrel 23 to be described below and is detachably fixed to the television camera device body 10 by being engaged with the lens mounting portion 11 of the television camera device body 10, a connection cable 22 that is connected to the television camera device body 10, and a barrel 23 that houses an optical system. The drive unit 30, which drives and controls the optical system housed in the barrel 23, is detachably screwed to the outer periphery of the barrel 23.

Since the drive unit 30 is provided with screw holes 30a, which are used to mount the drive unit 30 on the barrel 23, at predetermined positions so as to be capable of coping with interchangeable lenses having various specifications, screws are inserted into the screw holes 30a so that the drive unit 30 is mounted on the barrel 23. Various operation switches (hereinafter, referred to as an operation unit 301(FIG. 13)), such as a selection switch 31 that can select the automatic mode or the manual mode for each of the movement of a focus lens and a zoom lens to be described below and the opening and closing of an iris, a rocker switch 32 that is used to adjust a zoom, and a RET button 33 that can play back a taken video on the finder of the finder device 12, are provided on the outer surface of the drive unit 30.

A focus ring 23a that is used to adjust a focus, a zoom ring 23b that is used to adjust a zoom, and an iris ring 23c that is used to adjust an iris are provided on the outer periphery of the barrel 23 so as to be rotatable about the optical axis of the optical system housed in the barrel 23. When the focus lens and the zoom lens are mechanically driven by a cam mechanism in conjunction with the rotation of the focus ring 23a and the zoom ring 23b, the focus lens and the zoom are moved forward and rearward along the optical axis, so that a focus and a zoom are adjusted. Further, a plurality of aperture leaf blades of the iris are opened and closed in conjunction with the rotation of the iris ring 23c, so that the iris is adjusted.

Although not shown, the drive unit 30 includes motors, speed reduction mechanisms that transmit the torque of the motors to operation rings (the focus ring 23a, the zoom ring 23b, and the iris ring 23c), potentiometers that are engaged with the operation rings and detect the rotation angles of the operation rings, a controller 302 (FIG. 13) that drives and controls the motors on the basis of the rotation angles detected by the potentiometers, and a current output unit 303 (FIG. 13) that supplies current to various motors on the basis of the control of the controller 302. The motor, the speed reduction mechanism, and the potentiometer are provided for each of the operation rings.

When an automatic mode is selected by the selection switch 31 of the drive unit 30 and a zoom is to be adjusted, the rocker switch 32 is operated by a photographer P and a command signal for the instruction of the rotation angle of the zoom ring 23b is input to the controller 302 of the drive unit 30 according to the operation amount of the rocker switch 32. The controller 302 drives the motor until the rotation angle of the zoom ring 23b detected by the potentiometer reaches a rotation angle corresponding to the command signal. As a result, the zoom ring 23b is set to a desired rotation angle and a zoom is adjusted.

Even in the case of the adjustment of the focus and the iris performed by the drive unit 30, command signals for the instruction of the rotation angles of the focus ring 23a and the iris ring 23c are input to the controller 302 of the drive unit 30 from the outside (for example, an automatic focus controller, an automatic exposure controller, and the like provided in the television camera device body 10). The controller 302 drives the motors until the rotation angles of the focus ring 23a and the iris ring 23c detected by the potentiometers reach rotation angles corresponding to the command signals.

When a manual mode is selected by the selection switch 31 of the drive unit 30, the photographer P manually rotates the operation rings so that a focus, a zoom, and iris are adjusted.

The optical system, which is housed in the barrel 23, is broadly divided into a fixed lens system 24, a focus lens system 25, a first zoom lens system 26, a second zoom lens system 27, and a tracking optical system 29 in this order from the subject side, that is, the front side (the left side in FIG. 3).

The fixed lens system 24 is a lens group including one or more lenses, the lenses are held by a holding frame, and the holding frame is fixed to the barrel 23.

The focus lens system 25 is an optical system that is used to perform focusing for adjusting a subject distance where a focus is adjusted, that is, a focus position; and includes a first focus lens group F1 and a second focus lens group F2 that are supported so as to be movable forward and rearward along the optical axis. One or more lenses of the respective first and second focus lens groups F1 and F2 are held by holding frames (not shown), and the holding frames are adapted to be mechanically rotated and moved relative to the barrel 23 along the optical axis when the above-mentioned focus ring 23a is rotated.

Each of the first zoom lens system 26 and the second zoom lens system 27 is an optical system that is used to adjust a focal length (zoom magnification), the first zoom lens system 26 includes a first zoom lens group Z1 and a second zoom lens group Z2 that are supported so as to be movable forward and rearward along the optical axis, and the second zoom lens system 27 includes a third zoom lens group Z3 and a fourth zoom lens group Z4 that are supported so as to be movable forward and rearward along the optical axis. One or more lenses of the respective first and second zoom lens groups Z1 and Z2 are held by holding frames, and the holding frames are adapted to be mechanically rotated and moved relative to the barrel 23 along the optical axis when the above-mentioned zoom ring 23b is rotated.

One or more lenses of the respective third and fourth zoom lens groups Z3 and Z4 are held by third and fourth lens frames 45-3 and 45-4 (corresponding to first and second lens frames of the invention) to be described below; and the third and fourth lens frames 45-3 and 45-4 are housed in third and fourth zoom lens barrels 41 and 42 of a zoom lens barrel 40 to be described below so as to be movable forward and rearward along the optical axis, and the third and fourth zoom lens barrels 41 and 42 are adapted to be mechanically rotated and moved relative to the barrel 23 along the optical axis when the above-mentioned zoom ring 23b is rotated. The zoom lens barrel 40 will be described in detail later.

The second zoom lens system 27 is provided with an iris 28 between the third and fourth zoom lens groups Z3 and Z4, and the iris 28 changes an aperture by opening and closing the diaphragm blades to adjust the amount of light. The iris 28 is adapted so that the aperture leaf blades are opened and closed and the iris is adjusted when the above-mentioned iris ring 23c is rotated.

The tracking optical system 29 is an optical system that is used to form an image and is a lens group including one or more lenses. The lenses are held by holding frames, and the holding frames are adapted to be mechanically rotated and moved along the optical axis for the adjustment of the back focus of the tracking optical system or the like.

Mechanisms, which have been used in the past, can be used as mechanisms that mechanically rotate and move the above-mentioned holding frames and the third and fourth zoom lens barrels 41 and 42 relative to the barrel 23 along the optical axis.

Here, in this specification, movable lens units mean lenses that are moved by one drive mechanism or lens groups that move integrally or in conjunction with each other. In the interchangeable lens 20 of this embodiment, the first and second focus lens groups F1 and F2, the first, second, third, and fourth zoom lens groups Z1, Z2, Z3, and Z4, and a lens group forming the tracking optical system 29 correspond to the movable lens units.

Next, the zoom lens barrel 40 according to an embodiment of the invention will be described in detail below with reference to the drawings.

As shown in FIGS. 4 and 5, the zoom lens barrel 40 of this embodiment is to house the above-mentioned second zoom lens system 27, and includes the third zoom lens barrel 41 that houses the third lens frame 45-3 holding the third zoom lens group Z3 and the fourth zoom lens barrel 42 that houses the fourth lens frame 45-4 holding the fourth zoom lens group Z4. In this embodiment, as shown in FIG. 8, the third lens frame 45-3 holds a lens L3 as the third zoom lens group Z3, and the fourth lens frame 45-4 holds two lenses, that is, lenses L4-1 and L4-2 as the fourth zoom lens group Z4 from the subject side (the left side in FIG. 8). Further, the third zoom lens barrel 41 is shorter than the fourth zoom lens barrel 42 in the direction of the optical axis.

The third and fourth lens frames 45-3 and 45-4 are formed in the shape of a cylinder having a circular opening, and are installed adjacent to each other along the optical axis. As shown in FIGS. 5 and 7, a total of five VCMs 46, that is, two third VCMs (voice coil motors) 46-3 (corresponding to a second linear motor of the invention) and three fourth VCMs (voice coil motors) 46-4 (corresponding to a first linear motor of the invention) are disposed on the outer peripheries of the third and fourth lens frames 45-3 and 45-4. Groove portions 46a, which extend along the optical axis, are formed in five compartments among compartments, which are divided equally as six compartments at regular intervals, on the outer peripheries of the third and fourth lens frames 45-3 and 45-4, and the VCMs 46 are mounted in the five groove portions 46a, respectively.

Since the third and fourth VCMs 46-3 and 46-4 are mounted in the groove portions 46a formed on the outer peripheries of the third and fourth lens frames 45-3 and 45-4 as described above, the third and fourth VCMs 46-3 and 46-4 are arranged on the same circumference having a center on the optical axis. As a result, an increase in the diameter of the zoom lens barrel 40 can be prevented.

The third and fourth VCMs 46-3 and 46-4 are used to perform focusing for independently moving the third and fourth lens frames 45-3 and 45-4, which hold the third and fourth zoom lens groups Z3 and Z4, respectively, forward and rearward along the optical axis according to a subject distance in order to improve the accuracy of the aberration of the lens optical system, which is housed in the barrel 23, when zooming in which each of the first, second, third, and fourth zoom lens groups Z1, Z2, Z3, and Z4 moves forward and rearward along the optical axis is performed. Since the adjacent zoom lens groups, that is, the third and fourth zoom lens groups Z3 and Z4 move forward and rearward at the time of focusing associated with zooming as in this embodiment, an increase in the size of the zoom lens barrel 40 in the direction of the optical axis can be suppressed.

Figure 9:
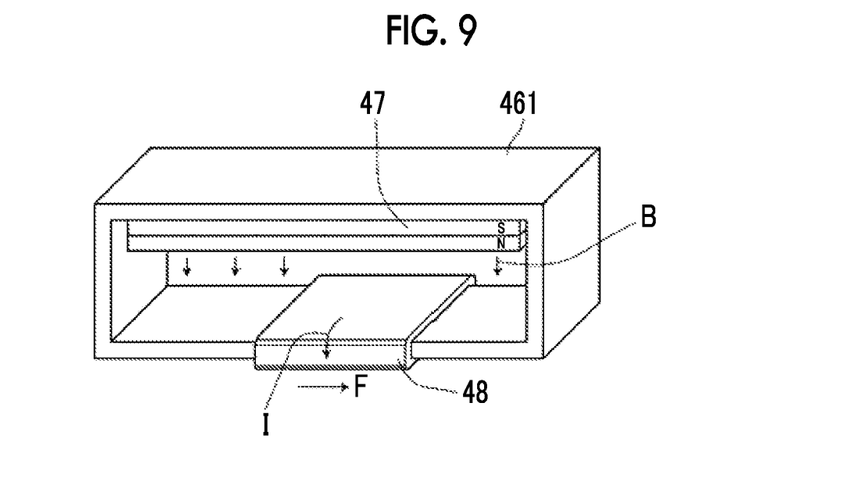
FIG. 9 is a diagram (a first diagram) illustrating the movement of a VCM.
Figure 10:
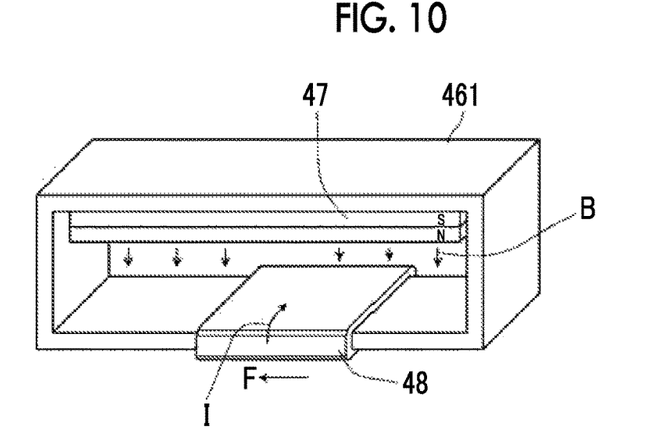
FIG. 10 is a diagram (a second diagram) illustrating the movement of the VCM.
Figure 11:
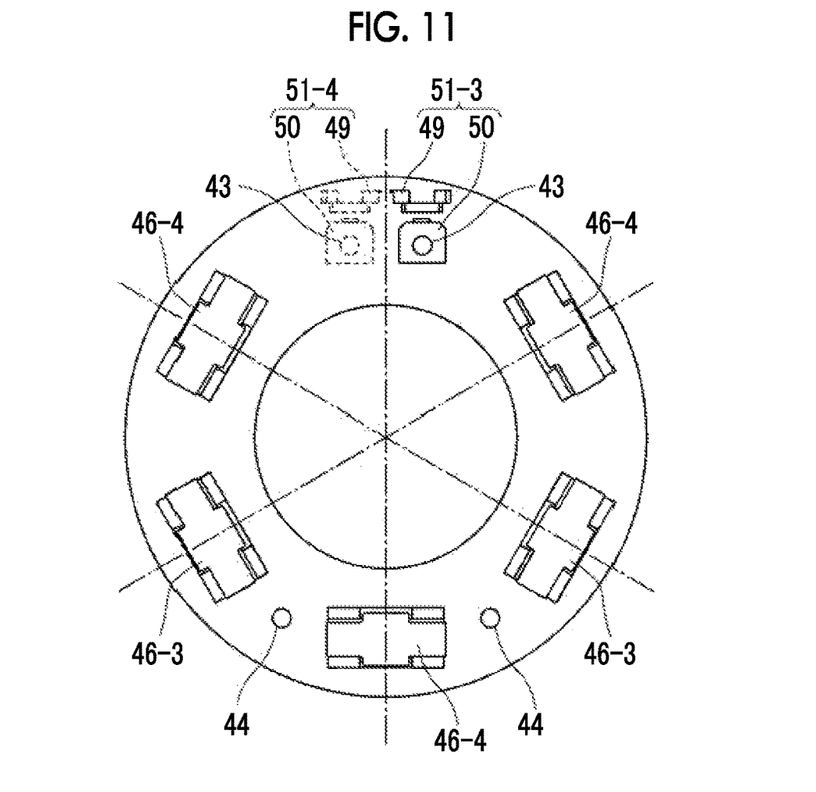
FIG. 11 is a diagram showing an example of the arrangement of VCMs.

Here, FIGS. 9 and 10 are diagrams illustrating the movement of the VCM 46, and FIG. 11 is a diagram showing an example of the arrangement of the VCMs 46. As shown in FIGS. 9 and 10, the VCM 46 includes a yoke 461, a magnet 47, and a coil 48. The yoke 461 is a member made of stainless steel and is formed in the shape of a tube having a rectangular cross-section. As shown in FIG. 5, one wide plate of a pair of wide plates 461a, which include wide surfaces facing each other, of the yoke 461 is fixed over the third and fourth zoom lens barrels 41 and 42 so that the long side of one wide plate is parallel to the optical axis, and the other wide plate of the pair of wide plates 461a is installed with a predetermined interval between itself and the bottom of the groove portion 46a formed in the third and fourth lens frames 45-3 and 45-4.

All the wide plates 461a of the yokes 461 of the third and fourth VCMs 46-3 and 46-4 are formed in the same shape, and are fixed to the third and fourth zoom lens barrels 41 and 42 so that end portions of the respective wide plates 461a in the direction of the optical axis are positioned in the same plane perpendicular to the optical axis.

Accordingly, since the third and fourth VCMs 46-3 and 46-4 are disposed so as to be within a certain distance in the direction of the optical axis, an increase in the size of the zoom lens barrel 40 in the direction of the optical axis can be suppressed.

Further, one narrow plate of a pair of narrow plates, which include narrow surfaces facing each other, of the yoke 461, that is, a narrow plate positioned on the subject side (the near side in FIGS. 4 and 5) in this embodiment serves as a removable opening/closing door 462, and is adapted so that a coil 48 to be described below can be inserted into the wide plate 461a when the opening/closing door 462 is opened.

As shown in FIGS. 5, 9, and 10, each of the wide plates 461a of the yokes 461, which are positioned close to the third and fourth lens frames 45-3 and 45-4, is provided with a coil 48 that is formed by winding a wire along a longitudinal direction, and the outer surface of the coil 48, which is close to the third and fourth lens frames 45-3 and 45-4, is fixed to the third and fourth lens frames 45-3 and 45-4.

Further, a plate-like magnet 47, which is formed of a neodymium magnet and has a thickness of about 2 mm, is bonded to the inner surface of the wide plate 461*a* that is positioned close to the third and fourth zoom lens barrels 41 and 42.

As shown in FIGS. 9 and 10, the coil 48 is formed so as to have a width shorter than the length of the wide plate 461*a* in the longitudinal direction of the wide plate 461*a*, and the wire of the coil 48 is wound with a gap between itself and the wide plate 461*a* so that the coil 48 is movable forward and rearward in the longitudinal direction of the wide plate 461*a*. The magnet 47 has the same width as the width of the wide plate 461*a* in the longitudinal direction; is formed so as to have a length slightly shorter than the length of the wide plate 461*a* in the longitudinal direction; is magnetized so that each of an S pole and an N pole has a thickness of about 1 mm; and is installed so that the side of the magnet 47 bonded to the wide plate 461*a* corresponds to the S pole and the side of the magnet 47 facing the coil 48 corresponds to the N pole. A gap is formed between the magnet 47 and the coil 48.

In a case in which current I is made to flow in the coil 48 of the VCM 46 having the above-mentioned structure clockwise when seen from the subject side, that is, when seen from the near side in FIGS. 5 and 6, a magnetic field B generated by the magnet 47 is emitted from the N pole toward the S pole. Accordingly, as shown in FIG. 9, the coil 48 moves to the right side in FIG. 9, that is, to the back side in FIGS. 5 and 6 (image side) according to the Fleming's left hand rule. Further, in a case in which current I is made to flow in the coil 48 counterclockwise when seen from the near side in FIGS. 5 and 6, a magnetic field B generated by the magnet 47 is emitted from the S pole toward the N pole. Accordingly, as shown in FIG. 10, the coil 48 moves to the left side in FIG. 9, that is, to the near side in FIGS. 5 and 6 (subject side) according to the Fleming's left hand rule.

When current based on the control of the controller 302 is supplied to each coil 48 from the current output unit 303 of the drive unit 30, each coil 48 can move according to the flow of current. When each coil 48 moves forward and rearward along the wide plate 461*a* as described above, the third and fourth lens frames 45-3 and 45-4 fixed to each coil 48 are also moved forward and rearward along the optical axis. In regard to the coil 48, the moving distance of the coil 48 is increased when the width of the coil 48 is smaller than the length of the wide plate 461*a* in the longitudinal direction, and the moving distance of the coil 48 is reduced when the width of the coil 48 is large. Since the width of the coil 48 of the third VCM 46-3 in the direction of the optical axis is smaller than the width of the coil 48 of the fourth VCM 46-4 in the direction of the optical axis as shown in FIG. 8 in this embodiment, the movable range of the third lens frame 45-3 in the direction of the optical axis is larger than the movable range of the fourth lens frame 45-4 in the direction of the optical axis.

The third and fourth VCMs 46-3 and 46-4 are used to independently move the third and fourth lens frames 45-3 and 45-4 forward and rearward along the optical axis, and are alternately arranged on the same circumference having a center on the optical axis, that is, on the outer peripheries of the third and fourth lens frames 45-3 and 45-4.

For the installation of third and fourth position detecting units 51-3 and 51-4 to be described below, a recessed portion 46*b* is formed along the direction of the optical axis over the third and fourth lens frames 45-3 and 45-4, in one compartment other than the five compartments in which the groove portions 46*a* in which the VCMs 46 are mounted are formed, that is, a compartment which is formed between the fourth VCMs 46-4 and in which the third VCM 46-3 is not disposed, among the compartments, which are divided equally as six compartments at regular intervals, on the outer peripheries of the third and fourth lens frames 45-3 and 45-4. Protruding portions 46*d*-3 and 46*d*-4, each which includes a main shaft hole 46*c* into which a main shaft 43 to be described below is inserted, are formed along the direction of the optical axis in the recessed portion 46*b* of the third and fourth lens frames 45-3 and 45-4 so as to protrude outward from the bottom of the recessed portion 46*b*. The main shaft 43 is a shaft that is used to guide the movement of the third and fourth lens frames 45-3 and 45-4 in the direction of the optical axis, and the main shaft 43 is fixed over the third and fourth zoom lens barrels 41 and 42.

Further, sub-shafts 44, which are used to guide the movement of the third and fourth lens frames 45-3 and 45-4 in the direction of the optical axis, are provided between the fourth VCM 46-4 and the third VCMs 46-3 at positions that face the third and fourth position detecting units 51-3 and 51-4 to be described below with the optical axis L interposed therebetween as shown in FIG. 11; and the sub-shafts 44 are fixed over the third and fourth zoom lens barrels 41 and 42 as in the case of the main shaft 43. Furthermore, insertion holes (not shown) into which the sub-shafts 44 are inserted are formed at the positions corresponding to the sub-shafts 44 on each of the third and fourth lens frames 45-3 and 45-4. Accordingly, when the third and fourth lens frames 45-3 and 45-4 are independently moved forward and rearward along the optical axis by the third and fourth VCMs 46-3 and 46-4, the third and fourth lens frames 45-3 and 45-4 are moved while being guided by the main shaft 43 and the sub-shafts 44. For convenience sake, only one sub-shaft 44 is shown in FIGS. 4 to 7.

As shown in FIG. 11, the three fourth VCMs 46-4 are arranged on the same circumference having a center on the optical axis L at an interval of 120°, that is, at regular intervals. Each of the two third VCMs 46-3 is arranged at an intermediate position between the fourth VCMs 46-4 on the same circumference having a center on the optical axis L. That is, the two third VCMs 46-3 are arranged on the same circumference having a center on the optical axis L at an interval of 120°.

When a balance in the arrangement of the plurality of VCMs 46 is bad, the center of gravity of movable units including the lens frames moved by the respective VCMs 46 deviates from the optical axis and the third and fourth lens frames 45-3 and 45-4 may be inclined. When the third and fourth lens frames 45-3 and 45-4 are moved while being inclined, vibration is generated. For this reason, there is a case in which the stability of the forward and rearward movement of the third and fourth lens frames 45-3 and 45-4 along the optical axis may deteriorate and operating noises may be increased. Further, since stopping accuracy also deteriorates when the stability of the forward and rearward movement of the third and fourth lens frames 45-3 and 45-4 along the optical axis is bad, high-speed focusing is difficult.

Since the third and fourth VCMs 46-3 and 46-4 are disposed in the zoom lens barrel 40 of this embodiment in balance as described above, the third and fourth lens frames 45-3 and 45-4 can stably move forward and rearward along the optical axis. Accordingly, operating noises are reduced, stopping accuracy is high, and it is possible to cope with high-speed focusing.

In this embodiment, the weight of the movable unit, which includes lenses of the third zoom lens group Z3 and the third lens frame 45-3, is about 30 g, and the weight of the movable unit, which includes lenses of the fourth zoom lens group Z4 and the fourth lens frame 45-4, is about 60 g. Further, the specifications of the third and fourth VCMs 46-3 and 46-4 are designed so that each of the movable units of the third and fourth zoom lens groups Z3 and Z4 moves a stroke of about 9 mm for about 0.2 sec. In this embodiment, the output of the third VCM 46-3 is set to be smaller than the output of the fourth VCM 46-4.

Furthermore, the third and fourth position detecting units 51-3 and 51-4, which detect the positions of the third and fourth lens frames 45-3 and 45-4 in the direction of the optical axis, that is, the positions of the third and fourth zoom lens groups Z3 and Z4, are disposed in one compartment other than the five compartments in which the groove portions 46a in which the VCMs 46 are mounted are formed, that is, a section which is formed between the fourth VCMs 46-4 and in which the third VCM 46-3 is not disposed (a space formed on the upper side of the optical axis L in FIG. 11), among the compartments, which are divided equally as six compartments at regular intervals, on the outer peripheries of the third and fourth lens frames 45-3 and 45-4. For convenience sake, the third and fourth position detecting units 51-3 and 51-4 are disposed side by side in FIG. 11. However, actually, as shown in FIG. 5, the third and fourth position detecting units 51-3 and 51-4 are disposed along a direction parallel to the optical axis so that the third position detecting unit 51-3 is disposed close to the third zoom lens group Z3, that is, on the near side and the fourth position detecting unit 51-4 is disposed close to the fourth zoom lens group Z4, that is, on the back side.

Since the third and fourth position detecting units 51-3 and 51-4 are disposed as described above, the third and fourth position detecting units 51-3 and 51-4 are disposed so as to have a certain interval from the VCMs 46. Accordingly, since the occurrence of a malfunction, which is caused by an influence of magnetism generated from the VCMs 46, can be prevented, the position detection accuracy of the third and fourth position detecting units 51-3 and 51-4 can be improved. Further, since the third and fourth position detecting units 51-3 and 51-4 are disposed on the outer peripheries of the third and fourth lens frames 45-3 and 45-4 as in the case of the VCM 46, the outer peripheral spaces of the third and fourth lens frames 45-3 and 45-4 can be effectively used. As a result, an increase in the diameter of the zoom lens barrel 40 can be prevented.

Figure 12:
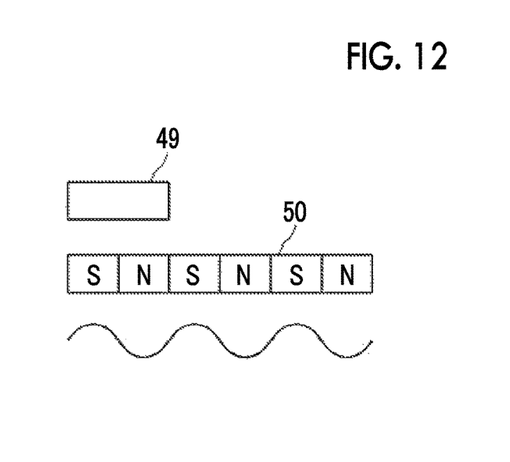
FIG. 12 is a diagram illustrating a method of detecting GMR.

Each of the third and fourth position detecting units 51-3 and 51-4 includes a GMR (giant magnetoresistance) sensor 49 (corresponding to a position detecting unit of the invention) and a sensor magnet 50 as shown in FIGS. 5 and 11. Here, FIG. 12 is a diagram illustrating a method of detecting GMR. The sensor magnets 50 is formed to be elongated as shown in FIG. 12, is magnetized so that S poles and N poles are alternately arranged at a predetermined pitch in the longitudinal direction, and is fixed to the upper surface of each of the protruding portions 46d -3 and 46d -4 along the longitudinal direction of each of the protruding portions 46d -3 and 46d -4 as shown in FIG. 5.

The GMR sensors 49 are fixed to the inner peripheral surfaces of the third and fourth zoom lens barrels 41 and 42 so as to be close to the sensor magnets 50, respectively. When the sensor magnets 50 move forward and rearward in the direction of the optical axis in association with the movement of the third and fourth lens frames 45-3 and 45-4, each of the GMR sensors 49 detects magnetism and outputs a signal, which corresponds to a change in magnetism, (see the lower side in FIG. 12) to the controller 302. The controller 302 calculates the positions of the third and fourth lens frames 45-3 and 45-4 in the direction of the optical axis on the basis of the signals output from the GMR sensors 49.

Figure 13:
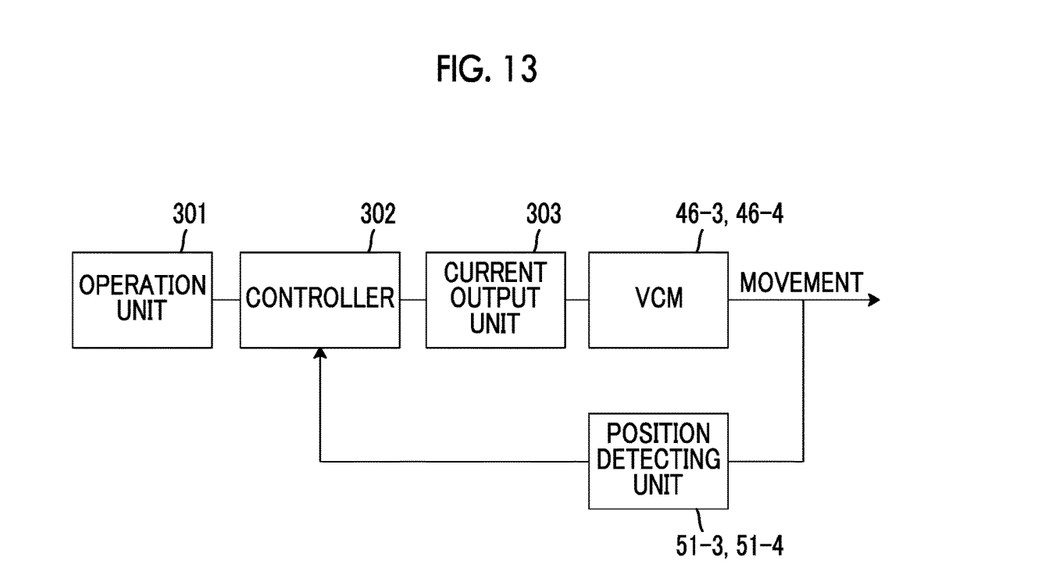
FIG. 13 is a diagram illustrating a method of controlling the zoom lens barrel of FIG. 4.

Next, FIG. 13 is a diagram illustrating a method of controlling the zoom lens barrel 40 of FIG. 4. As shown in FIG. 13, the controller 302 receives a command from the operation unit 301 of the drive unit 30, calculates the amount of current to be supplied to the third and fourth VCMs 46-3 and 46-4 on the basis of the command received from the operation unit 301, and outputs the calculated amount of current to the current output unit 303. The current output unit 303 supplies current, which is based on the output from the controller 302, to the third and fourth VCMs 46-3 and 46-4. The third and fourth VCMs 46-3 and 46-4 to which current has been supplied move the third and fourth lens frames 45-3 and 45-4 forward and rearward along the optical axis as described above, and the third and fourth position detecting units 51-3 and 51-4 detect the positions of the third and fourth lens frames 45-3 and 45-4 in the direction of the optical axis and output the detected positions to the controller 302. The controller 302 calculates the amount of current, which is to be supplied to the third and fourth VCMs 46-3 and 46-4 so that a subject distance is kept constant, on the basis of the outputs from the third and fourth position detecting units 51-3 and 51-4, and outputs the calculated amount of current to the current output unit 303. The zoom lens barrel 40 of this embodiment is controlled as described above.

According to the zoom lens barrel 40 of this embodiment, since the plurality of VCMs 46 are arranged on the same circumference that has a center on the optical axis L and in the plane that is perpendicular to the optical axis, an increase in the size of the zoom lens barrel 40 can be suppressed.

Further, according to the interchangeable lens 20 of this embodiment, the interchangeable lens 20 includes the zoom lens barrel 40. Accordingly, it is possible to realize higher accuracy of the aberration by performing focusing associated with zooming and it is also possible to suppress an increase in the size of the interchangeable lens 20 by suppressing an increase in the size of the zoom lens barrel 40. Since an increase in the size of the interchangeable lens 20 is suppressed, a detachable drive unit, which is used to drive and control the lens groups having been used in the past, can be used in common while realizing high accuracy of aberration.

Furthermore, according to the television camera device 1 of this embodiment, the television camera device 1 includes the zoom lens barrel 40. Accordingly, since an increase in the size of the zoom lens barrel 40 is suppressed, an increase in the size of the television lens mounted on the television camera device 1 can also be suppressed. Since an increase in the size of the television lens is suppressed, a detachable drive unit, which has been used to drive and control the lens groups in the past, can be used in common while realizing high accuracy of aberration.

As shown in FIG. 8, the zoom lens barrel 40 of the embodiment includes the third and fourth zoom lens barrels 41 and 42 that house the third and fourth lens frames 45-3 and 45-4 and are formed separately from each other. However, the invention is not limited thereto, and the third and fourth lens frames 45-3 and 45-4 may be adapted to be moved in one zoom lens barrel.

Further, a GMR sensor has been used as the position detecting unit in the embodiment. However, the invention is not limited thereto and the position detecting unit has only to be a sensor that can detect the positions of the third and fourth lens frames 45-3 and 45-4. For example, an MR (magnetoresistance) sensor or the like may be used.

Furthermore, the zoom lens barrel 40 of the embodiment has included two third VCMs 46-3 and three fourth VCMs 46-4. However, the invention is not limited thereto, and the number of third VCMs 46-3 may be equal to the number of fourth VCMs 46-4 and the number of fourth VCMs 46-4 may be larger than the number of third VCMs 46-3. The number of third VCMs and the number of fourth VCMs can be appropriately changed in consideration of the outputs of the third and fourth VCMs 46-3 and 46-4 and the weights of the movable units.

For example, in a case in which two third VCMs 46-3 and four fourth VCMs 46-4 are provided, the fourth VCMs 46-4 are arranged at regular intervals on the same circumference having a center on the optical axis and the third VCMs 46-3 are arranged at intermediate positions present between the fourth VCMs 46-4 and facing each other with the optical axis interposed therebetween so that the third and fourth VCMs 46-3 and 46-4 are disposed in balance. In this case, two compartments, which are present between the fourth VCMs 46-4 and in which the third VCM 46-3 is not disposed, are present, but a position detecting unit may be disposed in any compartment of the two compartments.

For example, in a case in which the weight of the movable unit, which includes lenses of the third zoom lens group Z3 and the third lens frame 45-3, is smaller than the weight of the movable unit, which includes lenses of the fourth zoom lens group Z4 and the fourth lens frame 45-4, as in the embodiment, the number of the third VCMs 46-3 may be set to be smaller than the number of the fourth VCMs 46-4 when the outputs of the third and fourth VCMs 46-3 and 46-4 are the same. Further, in a case in which the output of the third VCM 46-3 is larger than the output of the fourth VCM 46-4, the number of the third VCMs 46-3 may be set to be smaller than the number of the fourth VCMs 46-4.

Furthermore, the zoom lens barrel 40 of the embodiment can be used for the interchangeable lens 20 and the television lens of the television camera device 1, but can also be used for a digital still camera, a digital video camera, a digital camera using an interchangeable lens, a mobile phone with a camera, a personal digital assistant (PDA) with a camera, and the like.

A zoom lens barrel, an interchangeable lens using the zoom lens barrel, and a video camera device of the invention are not limited to the embodiment, and can be appropriately modified without departing from the scope of the invention.

What is claimed is:

1. A zoom lens barrel that houses a plurality of lens frames holding a plurality of movable lens units and supporting the plurality of movable lens units so that the movable lens units are movable forward and rearward along an optical axis,
   wherein the plurality of lens frames include a first lens frame and a second lens frame adjacent to each other, the zoom lens barrel comprising:
   a plurality of first linear motors and a plurality of second linear motors that move the first lens frame and the second lens frame forward and rearward independently for focusing associated with zooming,
   wherein the plurality of first linear motors and the plurality of second linear motors are arranged in a plane that is perpendicular to the optical axis and also alternately on the same circumference that has a center on the optical axis.

2. The zoom lens barrel according to claim 1,
   wherein the number of the second linear motors is smaller than the number of the first linear motors,
   the first linear motors are arranged at regular intervals on the same circumference, and
   the second linear motors are arranged at intermediate positions between the first linear motors.

3. The zoom lens barrel according to claim 2, further comprising:
   a position detecting unit that detects the positions of the movable lens units in a direction of the optical axis,
   wherein the first linear motors are disposed on both sides of the position detecting unit so as to be adjacent to the position detecting unit.

4. The zoom lens barrel according to claim 1,
   wherein the output of the first linear motor is the same as the output of the second linear motor.

5. The zoom lens barrel according to claim 2,
   wherein the output of the first linear motor is the same as the output of the second linear motor.

6. The zoom lens barrel according to claim 3,
   wherein the output of the first linear motor is the same as the output of the second linear motor.

7. The zoom lens barrel according to claim 1,
   wherein the output of the first linear motor is smaller than the output of the second linear motor.

8. The zoom lens barrel according to claim 2,
   wherein the output of the first linear motor is smaller than the output of the second linear motor.

9. The zoom lens barrel according to claim 3,
   wherein the output of the first linear motor is smaller than the output of the second linear motor.

10. The zoom lens barrel according to claim 1,
    wherein the output of the first linear motor is larger than the output of the second linear motor.

11. The zoom lens barrel according to claim 2,
    wherein the output of the first linear motor is larger than the output of the second linear motor.

12. The zoom lens barrel according to claim 3,
    wherein the output of the first linear motor is larger than the output of the second linear motor.

13. The zoom lens barrel according to claim 2,
    wherein the number of the second linear motors is two.

14. The zoom lens barrel according to claim 2,
    wherein the number of the first linear motors is three.

15. An interchangeable lens comprising:
    the zoom lens barrel according to claim 1.

16. An interchangeable lens comprising:
    the zoom lens barrel according to claim 2.

17. An interchangeable lens comprising:
    the zoom lens barrel according to claim 3.

18. A television camera device comprising:
    the zoom lens barrel according to claim 1.

19. A television camera device comprising:
    the zoom lens barrel according to claim 2.

20. A television camera device comprising:
    the zoom lens barrel according to claim 3.

* * * * *